Aug. 10, 1954  H. A. HECKENDORF  2,685,884
MILK LINE FLUSHING SYSTEM AND VALVE
MECHANISM AND REGULATOR THEREFOR
Filed April 7, 1953
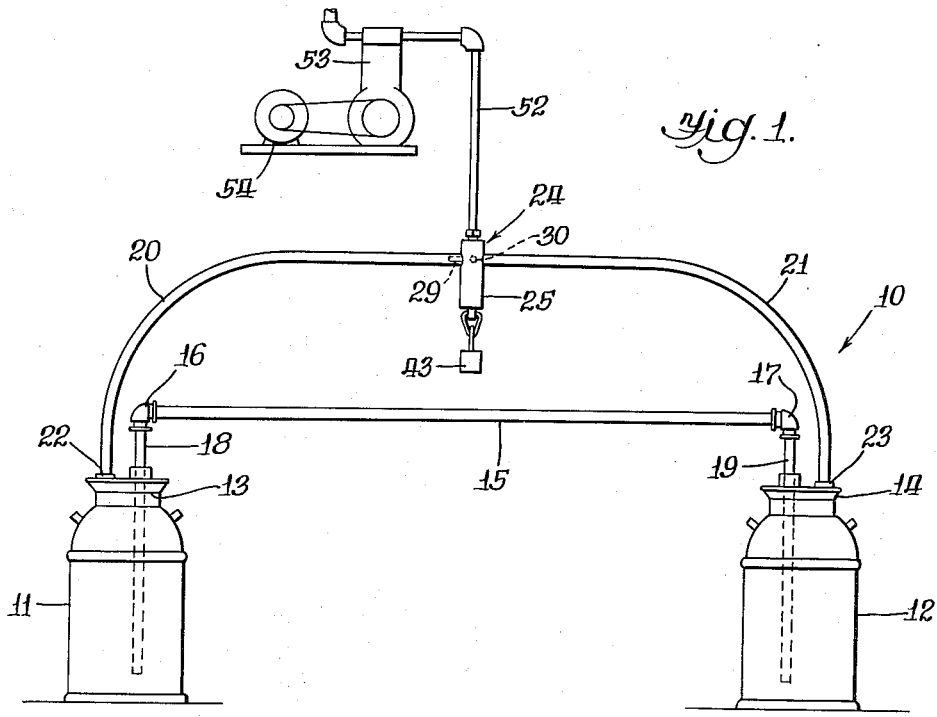
Fig. 1.
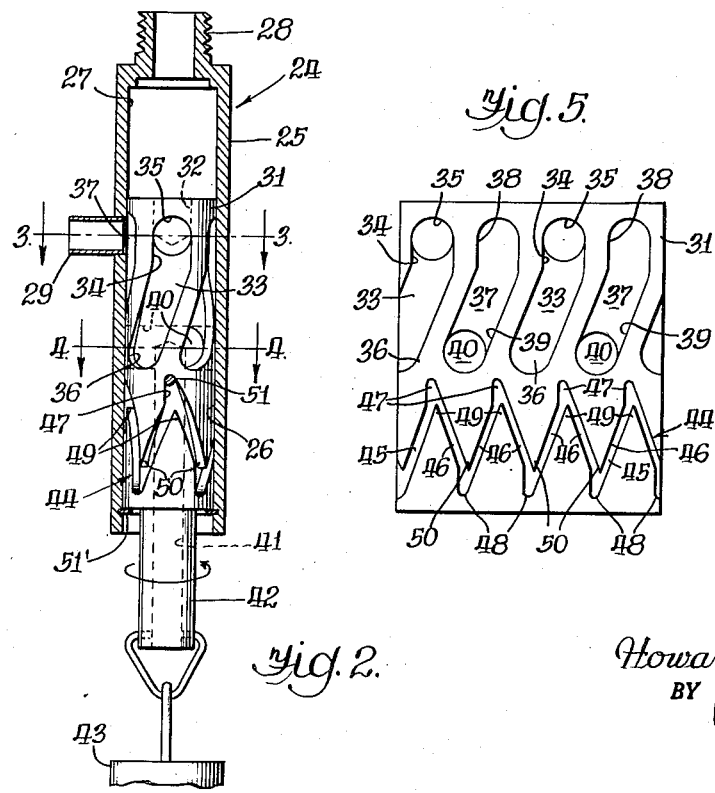
Fig. 2.
Fig. 5.
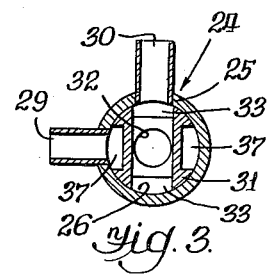
Fig. 3.
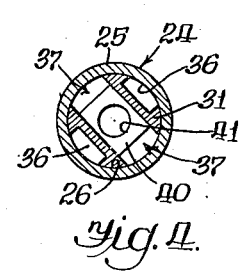
Fig. 4.
INVENTOR.
Howard A. Heckendorf
BY Paul O. Pippel
Atty Patented Aug. 10, 1954

2,685,884

UNITED STATES PATENT OFFICE 2,685,884

MILK LINE FLUSHING SYSTEM AND VALVE MECHANISM AND REGULATOR THEREFOR

Howard A. Heckendorf, Chicago, Ill., assignor to International Harvester Company, a corporation of New Jersey Application April 7, 1953, Serial No. 347,255

13 Claims. (Cl. 134—56)

This invention relates to a flushing and cleaning system of a type used in connection with a pipeline milking system. More specifically this invention relates to a vacuum and air regulating device adapted for use in connection with the flushing mechanism of a pipeline milker.

In the dairy industry the use of pipeline milkers has greatly increased. In a pipeline milker the milk is directed from the teat cups through a pipeline under vacuum which is connected to a series of milk cans under a minus pressure, these cans receiving the milk without exposure of the same to the atmosphere. A system of this type is exceedingly efficient in curtailing the growth of bacteria since it is what may be called a closed pipeline arrangement. To further the elimination of possible contamination it is necessary to periodically cleanse and sterilize the milk pipeline. In order to effect a positive cleaning of the line it is desirable to pass a cleansing solution back and forth through the pipeline a successive number of times. In order to reduce the time and labor requirements during the milking operation it is also desirable to effect this cleansing and flushing of the pipeline with a minimum of effort on part of the operator. One way to accomplish effective cleansing of the milk line is to connect one end of each line to a closed milk can or similar container. One of the cans is then substantially filled with a cleansing solution and each of the cans is connected by means of suitable conduits to a source of vacuum. By subjecting each can alternately to vacuum and air it is possible to draw the cleansing solution through the pipeline from one container to the other and to reverse this operation. Various control devices such as pulsating units have been disposed in the system to control the vacuum and air which is alternately supplied to each of the containers. It is a prime object of this invention to provide an improved vacuum and air regulating device which is positive and effective in operation and which requires a minimum of attention on part of the operator during operation.

Another object of this invention is to provide an improved vacuum and air regulating device for use in connection with a flushing system for pipeline milkers, the device including a casing having a reciprocating valve plunger, the plunger being arranged in response to vacuum to alternately supply vacuum and air conduits leading to containers containing a washing solution.

A more specific object is to provide an improved vacuum and air regulating device for pipeline flushing systems, the device including a casing having a vacuum chamber adapted to be connected to a source of vacuum, the casing further including a reciprocating valve plunger having channels in communication with vacuum, and channels in communication with air, the plunger being movable axially and rotatably by vacuum within the casing whereby the channels are adapted to alternately direct vacuum and air to the vacuum and air connections leading to the cans of the flushing system.

A still further specific object is the provision of an improved vacuum and air regulating device including a casing having a reciprocating and rotating plunger, the plunger including vacuum and atmosphere channels adapted to connect to vacuum and air connections during operation, the plunger being moved in an axial direction and simultaneously rotated in response to vacuum within the casing, and including a recessed cam track which is engaged by a cam follower on the casing whereby during axial movement of the plunger said camming arrangement is effective to rotate said plunger.

These and further specific objects will become more readily apparent from a reading of the specification when examined in connection with the sheet of drawing.

In the drawing:

Figure 1 is a side elevational view of a flushing system for flushing the pipeline of a milking unit, the flushing system being connected to an improved vacuum and air regulating device;

Figure 2 is a view partly in cross-section of a vacuum and regulating device embodying the novel features of the invention;

Figure 3 is a cross-sectional view taken along the line 3—3 of Figure 2;

Figure 4 is a cross-sectional view taken along the line 4—4 of Figure 2; and

Figure 5 is a developed elevational view of a portion of a plunger showing the arrangement of recessed channels and a circumferentially extending cam track.

Referring now particularly to Figure 1, a flushing device or system is generally designated by the reference character 10. The flushing device 10 includes a pair of laterally spaced milk cans 11 and 12. The cans 11 and 12 may, of course, consist of any suitable containers but since the device is primarily utilized for flushing the pipeline of a milking system it is convenient to use the conventional type of milk can. The cans 11 and 12 are provided with suitable covers or closure members 13 and 14. A pipeline 15 extends between the cans 11 and 12. The pipeline 15 normally carries the milk from the teats of the animal directly to a series of cans provided for the purpose. The milking machine elements have not been included in the disclosures since the present invention relates primarily to the flushing arrangement. The milk line 15 is connected by means of elbows 16 and 17 to vertical pipes 18 and 19. The pipes 18 and 19 extend respectively into the cans 11 and 12 and terminate adjacent the bottom of said cans.

Vacuum and air conduits 20 and 21 are respectively connected to the cans 11 and 12 as indicated at 22 and 23. A vacuum and air regulating device or control valve is generally indicated by the reference character 24.

The vacuum and air regulating device 24 comprises a cylindrical casing 25. The casing 25 is provided with an elongated axially extending bore 26. The upper end of the bore 26 forms a vacuum chamber 27. A vacuum connecting means 28 is in communication with the chamber 27. The casing 25 is provided with laterally extending vacuum and air connections or nipples 29 and 30.

A valve plunger 31 as best indicated in Figure 2 is reciprocally positioned within the bore 26. The valve plunger 31 includes a vertically extending vacuum passage 32 which is in communication with the vacuum chamber 27. A pair of oppositely disposed recessed vacuum channels 33 are provided in the valve plunger 31. The vacuum channels 33 are circumferentially spaced with respect to each other and extend axially within the plunger 31. The developed view Figure 5 clearly shows the channels 33 and their relationship to other portions of the plunger. Each of the vacuum channels 33 includes an upper channel portion 34 which is connected by a laterally extending bore 35. The lower end of each channel 33 is provided with a laterally offset lower portion 36. The portion 36 as best shown in Figure 5, is laterally offset or spirally offset with respect to the upper channel portion 34 for a reason which will presently become more apparent. The plunger 31 is also provided with a pair of recessed air channels 37, these air channels 37 being disposed between the vacuum channels 33, and being circumferentially spaced with respect thereto. Each recessed air channel 37 is provided with an upper channel portion 38 and a lower channel portion 39. The lower channel portion 39 is laterally spaced or spirally disposed with respect to the upper channel portion 38. The lower channel portions 39 are connected by a laterally extending bore 40. The bore 40 is in communication with a vertically extending air passage 41 which is provided in the plunger 31 and an extension thereof 42, the air passage opening outwardly to the atmosphere. A biasing member or weight 43 is suitably connected to the extension 42.

As best indicated in Figures 2 and 5 the plunger 31 is provided with a recessed cam track 44. The cam track 44 is provided with a plurality of diagonal and parallel grooves 45 which are connected by means of diagonal and parallel grooves 46, the connection being to form an irregular or sawtooth pattern extending circumferentially around the peripheral surface of the plunger 31. The grooves 45 and 46 are connected by means of upper and lower groove extensions 47 and 48 respectively. The groove extensions 47 are laterally offset with respect to apices 49 defining portions of the cam track 44. Likewise, the groove extensions 48 are laterally offset with respect to apices 50 defining extensions of the cam track. A cam follower or pin 51, as shown in Figure 2, is suitably connected rigidly to the casing 25, the cam follower 51 engaging the recessed cam track 44. The plunger 31, as shown in Figure 2, is engageable with a stop 51' positioned on the casing 25 for limiting the downward movement of the plunger 31.

As shown in Figure 1 the vacuum connecting means 28 is connected to a pipe arrangement 52 which in turn is in operative connection with a vacuum pump 53 suitably driven by a power unit 54.

In the position of the regulating device 24 shown in Figure 2 the can 11 is subject to atmospheric pressure and the can 12 is under vacuum. Thus, a washing or cleansing solution which is present in the container 11 is now drawn through the pipeline 15 into the container 12 thus flushing the pipeline 15. In the position indicated in Figure 2, the air channel 37 is in communication with the connection 29 which is in communication with the conduit 20. Air from the channel or passage 41 enters through the lateral bore 40 and into the channel 37 for communication with the connection 29. The chamber 27 is of course continually under vacuum and this vacuum is also present in the passage 32 and channel 33. Since one of the channels 33 as indicated in Figure 3 is in communication with the connection 30 vacuum is applied to the conduit 21 and the interior of the can 12.

This condition which is now present must of course exist until all of the washing liquid has been removed from the can 11 to the can 12. Vacuum within the vacuum chamber 27 is now effective to cause movement of the plunger 31 upwardly carrying the weight 43 also in the upward direction. The cam follower 51 as indicated in Figure 2 is disposed in the cam track 44. Since the groove extensions 47 are laterally offset with respect to the apices 49, upward movement of the plunger 31 causes the cam follower 41 to travel in the groove 45 thereupon rotating the plunger 31 in the direction of the arrow shown in Figure 2. The channels 33 and 37 have their lower portions 36 and 39 spirally offset so that communication is maintained between the channels 33 and 37 and the connections 29 and 30 despite the rotation and upward axial movement of the plunger 31. The plunger 31 moves upwardly in response to the vacuum existing within the chamber 27 for the full length of the bore 26. It is held in this position until all of the liquid has been removed from the container 11 to the container 12. When this happens air rushes through the pipe 18, the pipe 15 and into the container 12 whereupon the vacuum within the container 12, the conduit 21 and the chamber 27 is materially reduced. The weight 43 is now effective to bias the plunger 31 to its downward position in engagement with the stop 51'. During the downward movement of the plunger 31, the cam follower 51 by virtue of the offset relationship between the groove extension 48 and the apices 50, is effective to enter into one of the grooves 46 thus continuing the rotation of the plunger 31 in the direction of the arrow as shown in Figure 2. The plunger 31 is now moved so that the vacuum and air connection 29, which was previously in connection with one of the air channels 37, is now in communication with one of the vacuum channels 33 and vacuum is now applied to the conduit 20 and to the can 11. Likewise, the vacuum and air connection 30 is no longer in communication with the channel 37, but is in communication with one of the air channels 37 so that the container 12 is now subject to atmosphere. Thus, the washing liquid is now returned from the container 12 through the pipeline 15 and into the container 11. The cycle of operation thus can be repeated a successive number of times for a period as long as the vacuum is applied to the vacuum and air regulating device 24.

It is now apparent that washing liquid can be successively passed through the pipeline 15 from one container to the other and that the operation can be continued for a period as long as the vacuum is applied to the regulating device. No attention need be given by the operator to the arrangement until he feels satisfied that a sufficient number of flushing passes have been made. Thus, the pipeline of the milking system is effectively flushed by the utilization of the novel and simple vacuum and air regulating device.

It must be understood that changes and modifications may be made which do not depart from the spirit of the invention as disclosed or from the scope thereof as defined in the appended claims.

What is claimed is:

1. For a pipeline flushing device including first and second containers, a pipeline to be flushed connected to said containers, and first and second vacuum and air conduits respectively connected to said first and second containers, said vacuum and air conduits being adapted to alternately connect to a source of vacuum and the atmosphere; a vacuum and air regulating device comprising a cylindrical casing having an elongated bore open at its upper and lower ends, vacuum connecting means adapted to connect the upper open end of said bore to a source of vacuum, the lower open end of said bore continually communicating with the atmosphere, a first vacuum and air connection on said casing adapted to communicate with said first vacuum and air conduit, a second vacuum and air connection adapted to connect with said second vacuum and air conduit, a valve plunger reciprocably positioned within said elongated bore, said plunger having an open end axially extending vacuum passage in continual communication with said vacuum connecting means, said plunger including an axially extending air passage open to the atmosphere at its lower end, said plunger including a laterally extending passage in communication with the air passage and opening outwardly of said plunger, a plurality of recessed vacuum channels provided in the outer peripheral surface of said valve plunger, said channels being circumferentially spaced with respect to each other, extending axially with respect to said plunger and having first upper end portions in continual communication with said vacuum passage, the first upper end portions being adapted to alternately communicate with the first and second vacuum and air connections, said vacuum channels having first lower end portions offset laterally with respect to said first upper end portions of said vacuum channels, a plurality of air channels provided in the outer periphery of said valve plunger, said air channels being circumferentially spaced with respect to each other, extending axially with respect to said plunger, having second upper end portions adapted to alternately communicate with the first and second vacuum and air connection, and second lower end portions in continual communication with said air passage, said second lower end portions being laterally offset with respect to said second upper end portions, means for rotating said valve plunger during reciprocation thereof whereby said air and vacuum channels are alternately connected to said first and second vacuum and air connections, said means comprising a saw-tooth shaped cam track recessed in the outer peripheral surface of said plunger, said cam track including an irregular camming surface extending circumferentially coextensive with the peripheral surface, a pin connected to said casing and engaging said camming surface of cam track, said plunger being rotated during reciprocation in response to the movement of said camming surface relative to said pin, and means connected to said plunger for biasing movement of said plunger in one direction.

2. For a pipeline flushing device including first and second containers, a pipeline to be flushed connected to said containers, and first and second vacuum and air conduits respectively connected to said first and second containers, said vacuum and air conduits being adapted to alternately connect to a source of vacuum and the atmosphere; a vacuum and air regulating device comprising a cylindrical casing having an elongated bore open at its upper and lower ends, vacuum connecting means adapted to connect the upper open end of said bore to a source of vacuum, the lower open end of said bore continually communicating with the atmosphere, a first vacuum and air connection on said casing adapted to communicate with said first vacuum and air conduit, a second vacuum and air connection adapted to connect with said second vacuum and air conduit, a valve plunger reciprocably positioned within said elongated bore, said plunger having an open end axially extending vacuum passage in continual communication with said vacuum connecting means, said plunger including an axially extending air passage open to the atmosphere at its lower end, said plunger including a laterally extending passage in communication with the air passage and opening outwardly of said plunger, a plurality of recessed vacuum channels provided in the outer peripheral surface of said valve plunger, said channels being circumferentially spaced with respect to each other, extending axially with respect to said plunger and having first upper end portions in continual communication with said vacuum passage, said channels having first lower end portions offset laterally with respect to first said upper end portions of said vacuum channels, a plurality of air channels provided in the outer periphery of said valve plunger, said air channels being circumferentially spaced with respect to each other, extending axially with respect to said plungers, having second upper end portions and second lower end portions in continual communication with said air passage, said second lower end portions being laterally offset with respect to said second upper end portions, means for rotating said valve plunger during reciprocation thereof whereby said air and vacuum channels are alternately connected to said first and second vacuum and air connections, said means comprising a saw-tooth shaped cam track recessed in the outer peripheral surface of said plunger, said cam track including an irregular camming surface extending circumferentially coextensive with the peripheral surface, a pin connected to said casing and engaging said camming surface of cam track, said plunger being rotated during reciprocation in response to the movement of said camming surface relative to said pin, and means connected to said plunger for biasing movement of said plunger in one direction, said means including a weight.

3. For a pipeline flushing device including first and second containers, a pipeline to be flushed connected to said containers, and first and second vacuum and air conduits respectively connected to said first and second containers, said vacuum and air conduits being adapted to alternately connect to a source of vacuum and the atmosphere; a vacuum and air regulating device comprising a cylindrical casing having an elongated bore open at its upper and lower ends, vacuum connecting means adapted to connect the upper open end of said bore to a source of vacuum, the lower open end of said bore continually communicating with the atmosphere, a first vacuum and air connection on said casing adapted to communicate with said first vacuum and air conduit, a second vacuum and air connection adapted to connect with said second vacuum and air conduit, a valve plunger reciprocably positioned within said elongated bore, said plunger having an open end axially extending vacuum passage in continual communication with said vacuum connecting means, said plunger including an axially extending air passage open to the atmosphere at its lower end, said plunger including a laterally extending passage in communication with the air passage and opening outwardly of said plunger, a plurality of recessed vacuum channels provided in the outer peripheral surface of said valve plunger, said channels being circumferentially spaced with respect to each other, extending axially with respect to said plunger and having first upper end portions in continual communication with said vacuum passage, said vacuum channels having first lower end portions offset laterally with respect to said first upper end portions of said vacuum channels, a plurality of air channels provided in the outer periphery of said valve plunger, said air channels being circumferentially spaced with respect to each other, extending axially with respect to said plunger, having second upper end portions and second lower end portions in continual communication with said air passage, said second lower end portions being laterally offset with respect to said second upper end portions, means for rotating said valve plunger during reciprocation thereof whereby said air and vacuum channels are alternately connected to said first and second vacuum and air connections, said means comprising a saw-tooth shaped cam track recessed in the outer peripheral surface of said plunger, said cam track including an irregular camming surface extending circumferentially coextensive with the peripheral surface, and a pin connected to said casing and engaging said camming surface of cam track, said plunger being rotated during reciprocation in response to the movement of said camming surface relative to said pin.

4. For a pipeline flushing device including first and second containers, a pipeline to be flushed connected to said containers, and first and second vacuum and air conduits respectively connected to said first and second containers, said vacuum and air conduits being adapted to alternately connect to a source of vacuum and the atmosphere; a vacuum and air regulating device comprising a cylindrical casing having an elongated bore open at its upper and lower ends, vacuum connecting means adapted to connect the upper open end of said bore to a source of vacuum, the lower open end of said bore continually communicating with the atmosphere, a first vacuum and air connection on said casing adapted to communicate with said first vacuum and air conduit, a second vacuum and air connection adapted to connect with said second vacuum and air conduit, a valve plunger reciprocably positioned within said elongated bore, said plunger having an open end axially extending vacuum passage in continual communication with said vacuum connecting means, said plunger including an axially extending air passage open to the atmosphere, a plurality of recessed vacuum channels provided in the outer peripheral surface of said valve plunger, said channels being circumferentially spaced with respect to each other, extending axially with respect to said plunger and having first upper end portions in continual communication with said vacuum passage, said vacuum channels having first lower end portions offset laterally with respect to said first upper end portion of said vacuum channels, a plurality of air channels provided in the outer periphery of said valve plunger, said air channels being circumferentially spaced with respect to each other, extending axially with respect to said plunger, and having second upper end portions and second lower end portions in continual communication with said air passage, said second lower end portions being laterally offset with respect to said second upper end portions, means for rotating said valve plunger during reciprocation thereof whereby said air and vacuum channels are alternately connected to said first and second vacuum and air connections, said means comprising a saw-tooth shaped cam track recessed in the outer peripheral surface of said plunger, said cam track including an irregular camming surface extending circumferentially coextensive with the peripheral surface and cam follower means connected to said casing and engaging said camming surface of cam track, said plunger being rotated during reciprocation in response to the movement of said camming surface relative to said follower means.

5. For a pipeline flushing device including first and second containers, a pipeline to be flushed connected to said containers, and first and second vacuum and air conduits respectively connected to said first and second containers, said vacuum and air conduits being adapted to alternately connect to a source of vacuum and atmosphere; a vacuum and air regulating device comprising a cylindrical casing having an elongated bore, vacuum connecting means adapted to connect one end of said bore to a source of vacuum, said bore having its other end in communication with the atmosphere, a first vacuum and air connection on said casing adapted to communicate with said first conduit, a second vacuum and air connection adapted to communicate with said second conduit, a valve plunger positioned for reciprocation within said bore, said plunger having a vacuum passage in communication with said vacuum connecting means, and an air passage in communication with the atmosphere, a plurality of recessed vacuum channels provided in the outer peripheral surface of said valve plunger, said vacuum channels extending axially and being circumferentially spaced with respect to each other, said vacuum channels including first portions in communication with the vacuum connecting means and second portions spirally offset with respect to said first portions, a plurality of recessed air channels provided in the outer peripheral surface of said plunger, said air channels being circumferentially spaced with respect to each other, the air channels including first portions and second portions spirally offset with respect to said first portions, the first and second portions of said air channels being in communication with the air passage, and means for rotating and moving said plunger axially thereby alternately connecting said vacuum and air channels with said first and second vacuum and air connections whereby vacuum is directed to one of said connections and air to the other.

6. For a pipeline flushing device including first and second containers, a pipeline to be flushed connected to said containers, and first and second vacuum and air conduits respectively connected to said first and second containers, said vacuum and air conduits being adapted to alternately connect to a source of vacuum and atmosphere; a vacuum and air regulating device comprising a cylindrical casing having an elongated bore, vacuum connecting means adapted to connect one end of said bore to a source of vacuum, said bore having its other end in communication with the atmosphere, a first vacuum and air connection on said casing adapted to communicate with said first conduit, a second vacuum and air connection adapted to communicate with said second conduit, a valve plunger positioned for reciprocation within said bore, said plunger having a vacuum passage in communication with said vacuum connecting means, and an air passage in communication with the atmosphere, a plurality of recessed vacuum channels provided in the outer peripheral surface of said valve plunger, said vacuum channels extending axially and being circumferentially spaced with respect to each other, said vacuum channels including first portions in communication with the vacuum connecting means and second portions spirally offset with respect to said first portions, a plurality of recessed air channels provided in the outer peripheral surface of said plunger, said air channels being circumferentially spaced with respect to each other, the air channels including first portions and second portions spirally offset with respect to said first portions, the first and second portions of said air channels being in communication with the air passage, said plunger being movable axially and rotatably by vacuum communicating through said vacuum connecting means thereby alternately connecting said vacuum and air channels with said first and second vacuum and air connections whereby vacuum is alternately directed to one of said connections and air to the other.

7. For a pipeline flushing device including first and second containers, a pipeline to be flushed connected to said containers, and first and second vacuum and air conduits respectively connected to said first and second containers, said vacuum and air conduits being adapted to alternately connect to a source of vacuum and atmosphere; a vacuum and air regulating device comprising a cylindrical casing having an elongated bore, vacuum connecting means adapted to connect one end of said bore to a source of vacuum, said bore having its other end in communication with the atmosphere, a first vacuum and air connection on said casing adapted to communicate with said first conduit, a second vacuum and air connection adapted to communicate with said second conduit, a valve plunger positioned for reciprocation within said bore, said plunger having a vacuum passage in communication with said vacuum connecting means, and an air passage in communication with the atmosphere, a plurality of recessed vacuum channels provided in the outer peripheral surface of said valve plunger, said vacuum channels extending axially and being circumferentially spaced with respect to each other, said vacuum channels including first portions in communication with the vacuum connecting means and second portions spirally offset with respect to said first portions, a plurality of recessed air channels provided in the outer peripheral surface of said plunger, said air channels being circumferentially spaced with respect to each other, the air channels including first portions and second portions spirally offset with respect to said first portions, the first and second portions of said air channels being in communication with the air passage, said bore of the casing including a vacuum chamber positioned adjacent one end of said plunger, said chamber being in communication with said vacuum passage and said vacuum connecting means, said plunger being movable in response to said vacuum in said chamber, axially and rotatably, thereby alternately connecting said vacuum and air channels with said first and second vacuum and air connections whereby vacuum is alternately directed to one of said connections and air to the other.

8. For a pipeline flushing device including first and second containers, a pipeline to be flushed connected to said containers, and first and second vacuum and air conduits respectively connected to said first and second containers, said vacuum and air conduits being adapted to alternately connect to a source of vacuum and atmosphere; a vacuum and air regulating device comprising a cylindrical casing having a vacuum chamber, vacuum connecting means adapted to connect said vacuum chamber with a source of vacuum, first and second vacuum and air connections on said casing, a plunger reciprocably and rotatably positioned within said chamber, said plunger having a vacuum passage in communication with the vacuum chamber, a vacuum channel on said plunger in communication with the vacuum passage, an air channel on said plunger in communication with the atmosphere, said channels being disposed to alternately register with the vacuum and air connections during rotation and reciprocating movement of said plunger, said plunger being movable in one direction in response to vacuum within said chamber, and means between said casing and said plunger for rotating said plunger during reciprocation whereby vacuum is directed to said first connection and air is directed to said second connection.

9. For a pipeline flushing device including first and second containers, a pipeline to be flushed connected to said containers, and first and second vacuum and air conduits respectively connected to said first and second containers, said vacuum and air conduits being adapted to alternately connect to a source of vacuum and atmosphere; a vacuum and air regulating device comprising a cylindrical casing having a vacuum chamber, vacuum connecting means adapted to connect said vacuum chamber with a source of vacuum, first and second vacuum and air connections on said casing, a plunger reciprocably and rotatably positioned within said chamber, said plunger having a vacuum passage in communication with the vacuum chamber, a vacuum channel on said plunger in communication with the vacuum passage, an air channel on said plunger in communication with the atmosphere, said channels being disposed to alternately register with the vacuum and air connections during rotation and reciprocating movement of said plunger, said plunger being movable in one direction in response to vacuum within said chamber, and means between said casing and said plunger for rotating said plunger during reciprocation whereby vacuum is directed to said first connection and air is directed to said second connection, and biasing means for moving said plunger in a second direction whereby said plunger is moved and rotated and air is directed to said first connection, and vacuum is directed to said second connection.

10. For a pipeline flushing device including first and second containers, a pipeline to be flushed connected to said containers, and first and second vacuum and air conduits respectively connected to said first and second containers, said vacuum and air conduits being adapted to alternately connect to a source of vacuum and atmosphere; a vacuum and air regulating device comprising a cylindrical casing having a vacuum chamber, vacuum connecting means adapted to connect said vacuum chamber with a source of vacuum, first and second vacuum and air connections on said casing, a plunger reciprocably and rotatably positioned within said chamber, said plunger having a vacuum passage in communication with the vacuum chamber, a vacuum channel on said plunger in communication with the vacuum passage and an air channel on said plunger in communication with the atmosphere, said channels being disposed to alternately register with the vacuum and air connections during rotation and reciprocation of said plunger, said plunger being movable axially in response to vacuum within said chamber, and means connected between said casing and said plunger for rotating said plunger during reciprocation.

11. For a pipeline flushing device including first and second containers, a pipeline to be flushed connected to said containers, and first and second vacuum and air conduits respectively connected to said first and second containers, said vacuum and air conduits being adapted to alternately connect to a source of vacuum and atmosphere; a vacuum and air regulating device comprising a cylindrical casing having a vacuum chamber, vacuum connecting means adapted to connect said vacuum chamber with a source of vacuum, first and second vacuum and air connections on said casing, a plunger reciprocably and rotatably positioned within said chamber, said plunger having a vacuum passage in communication with the vacuum chamber, a vacuum channel on said plunger in communication with the vacuum passage and an air channel on said plunger in communication with the atmosphere, said channels being disposed to alternately register with the vacuum and air connections during rotation and reciprocation of said plunger, said plunger being movable axially in response to vacuum within said chamber, and camming means disposed between said casing and said plunger for rotating said plunger in response to said axial movement.

12. For a pipeline flushing device including first and second containers, a pipeline to be flushed connected to said container, and first and second vacuum and air conduits respectively connected to said first and second containers, said vacuum and air conduits being adapted to alternately connect to a source of vacuum and atmosphere; a vacuum and air regulating device comprising a cylindrical casing having a vacuum chamber, vacuum connecting means adapted to connect said vacuum chamber with a source of vacuum, first and second vacuum and air connections on said casing, a plunger reciprocably and rotatably positioned within said chamber, said plunger having a vacuum passage in communication with the vacuum chamber, a vacuum channel on said plunger in communication with the vacuum passage and an air channel on said plunger in communication with the atmosphere, said channels being disposed to alternately register with the vacuum and air connections during rotation and reciprocation of said plunger, said plunger being movable axially in response to vacuum within said chamber, an irregular cam track circumferentially disposed around said plunger, and a cam follower on said casing engaging said cam for rotating said plunger in response to said axial movement.

13. For a pipeline flushing device including first and second containers, a pipeline to be flushed connected to said containers, and first and second vacuum and air conduits respectively connected to said first and second containers, said vacuum and air conduits being adapted to alternately connect to a source of vacuum and atmosphere; a vacuum and air regulating device comprising a cylindrical casing having a vacuum chamber, vacuum connecting means adapted to connect said vacuum chamber with a source of vacuum, first and second vacuum and air connections on said casing, a plunger reciprocably and rotatably positioned within said chamber, said plunger having a vacuum passage in communication with the vacuum chamber, a vacuum channel on said plunger in communication with the vacuum passage and an air channel on said plunger in communication with the atmosphere, said channels being disposed to alternately register with the vacuum and air connections during rotation and reciprocation of said plunger, said plunger being movable axially in response to vacuum within said chamber, a saw tooth shaped cam track circumferentially recessed in said plunger, and a cam follower on said casing engaging said cam track for rotating said plunger in response to said axial movement.

References Cited in the file of this patent

UNITED STATES PATENTS

| Number | Name | Date |
|---|---|---|
| 1,858,266 | Dinesen | May 17, 1932 |
| 2,650,179 | Anderson | Aug. 25, 1953 |